United States Patent [19]
Smart et al.

[11] Patent Number: 5,290,138
[45] Date of Patent: Mar. 1, 1994

[54] LOADING AND RECOVERY APPARATUS WITH SELF-LOCKING L-ARM

[75] Inventors: Leslie Smart; Gary MacQueen, both of New Albany, Miss.

[73] Assignee: American Hook Lift, Inc., New Albany, Miss.

[21] Appl. No.: 929,664

[22] Filed: Aug. 13, 1992

[51] Int. Cl.⁵ .................................. B60P 1/64
[52] U.S. Cl. ........................... 414/491; 414/498; 414/546
[58] Field of Search ............... 414/491, 498, 546, 555

[56] References Cited

U.S. PATENT DOCUMENTS

| | | | |
|---|---|---|---|
| 2,550,230 | 4/1951 | Dalton | 414/494 |
| 2,745,566 | 5/1956 | Bouffard | 414/494 |
| 3,819,075 | 6/1974 | Derain | 414/491 |
| 3,874,537 | 4/1975 | Kou | 414/491 |
| 3,878,948 | 4/1975 | Corompt | 414/546 |
| 3,892,323 | 7/1975 | Corompt | 414/491 |
| 3,937,166 | 3/1976 | Durham | 414/491 X |
| 3,942,664 | 3/1976 | Lemaire | 414/498 X |
| 3,944,095 | 3/1976 | Brown | 414/494 X |
| 3,964,625 | 6/1976 | Wirz | 414/498 X |
| 3,988,035 | 10/1976 | Corompt | 414/498 X |
| 4,111,321 | 9/1978 | Webster | 414/498 X |
| 4,175,904 | 11/1979 | Airaksinen | 414/498 X |
| 4,755,098 | 7/1988 | Wulf et al. | 414/491 X |
| 5,007,792 | 4/1991 | Wiedeck et al. | 414/500 |
| 5,108,247 | 4/1992 | Vlaanderen | 414/546 X |

FOREIGN PATENT DOCUMENTS

| | | | |
|---|---|---|---|
| 2628060 | 1/1977 | Fed. Rep. of Germany | 414/491 |
| 2595303 | 9/1987 | France | 414/546 |
| 58-180334 | 10/1983 | Japan . | |
| 166539 | 8/1985 | Japan | 414/546 |
| 6181831 | 4/1986 | Japan . | |
| 1397329 | 5/1988 | U.S.S.R. | 414/546 |
| 2135658 | 9/1984 | United Kingdom . | |

OTHER PUBLICATIONS

Vulcan Equipment Company, Inc., Vulcan 610 MLS Brochure.

*Primary Examiner*—David A. Bucci
*Attorney, Agent, or Firm*—Niro, Scavone, Haller & Niro

[57] ABSTRACT

An improved multi-function loading and recovery apparatus for pallets, containers and the like having a simple, effective design while enabling efficient operation in a wide variety of recovery operations. This multi-function loading and recovery apparatus utilizes a unique self-locking L-Arm, a portion of which is extendable and retractable, so that the L-Arm can be engaged or disengaged with a tilt frame when the L-Arm is in a variety of lengths, enabling the utilization of containers of various lengths. The present invention further allows either the rotation of a tilting frame with the L-Arm for tilting and dumping, or the rotation of the L-Arm alone for unloading of the container.

11 Claims, 5 Drawing Sheets

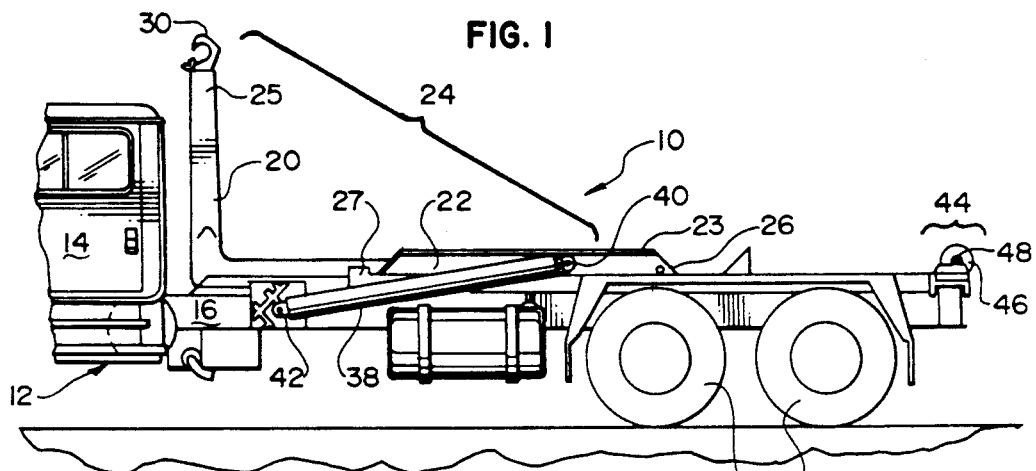
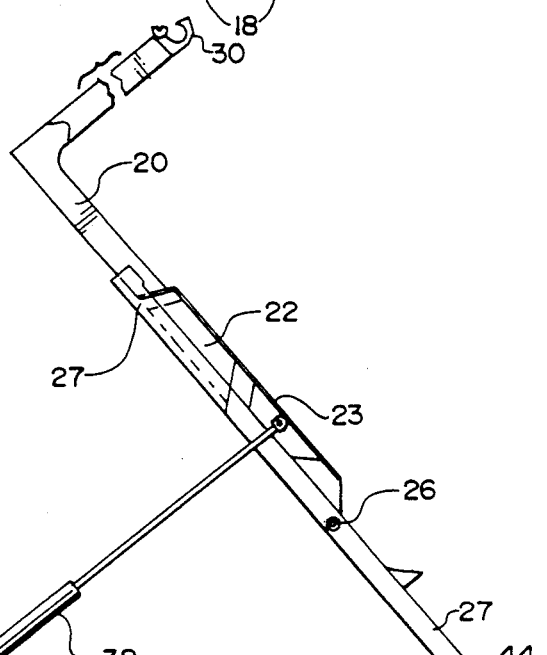
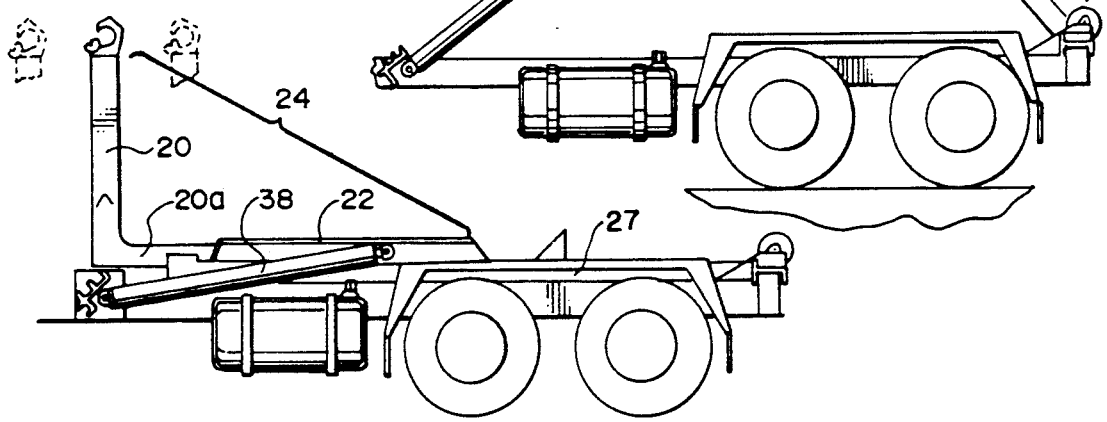

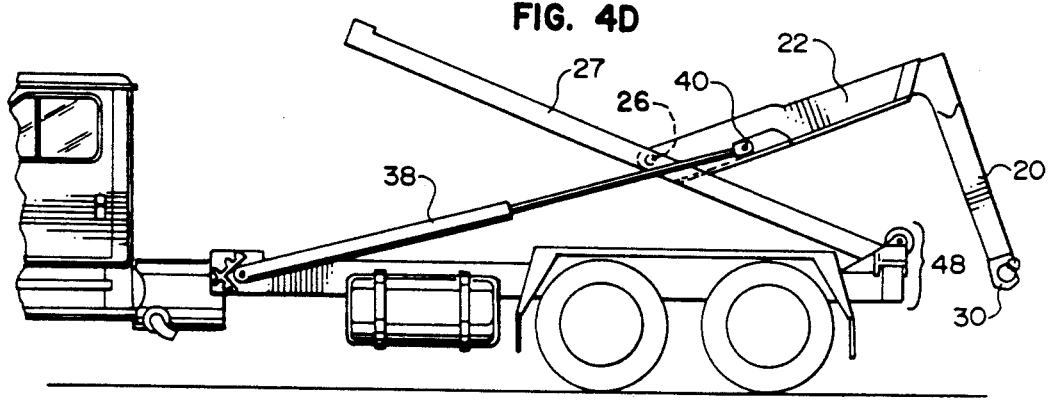
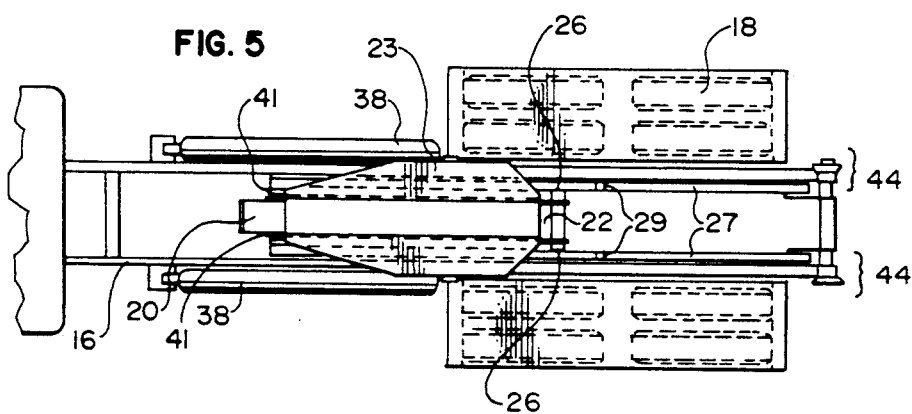
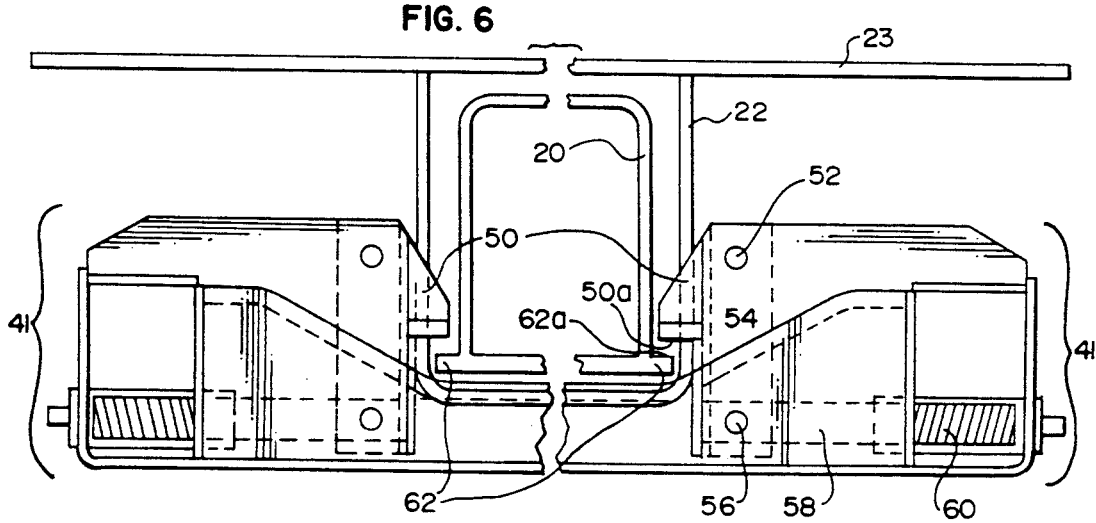

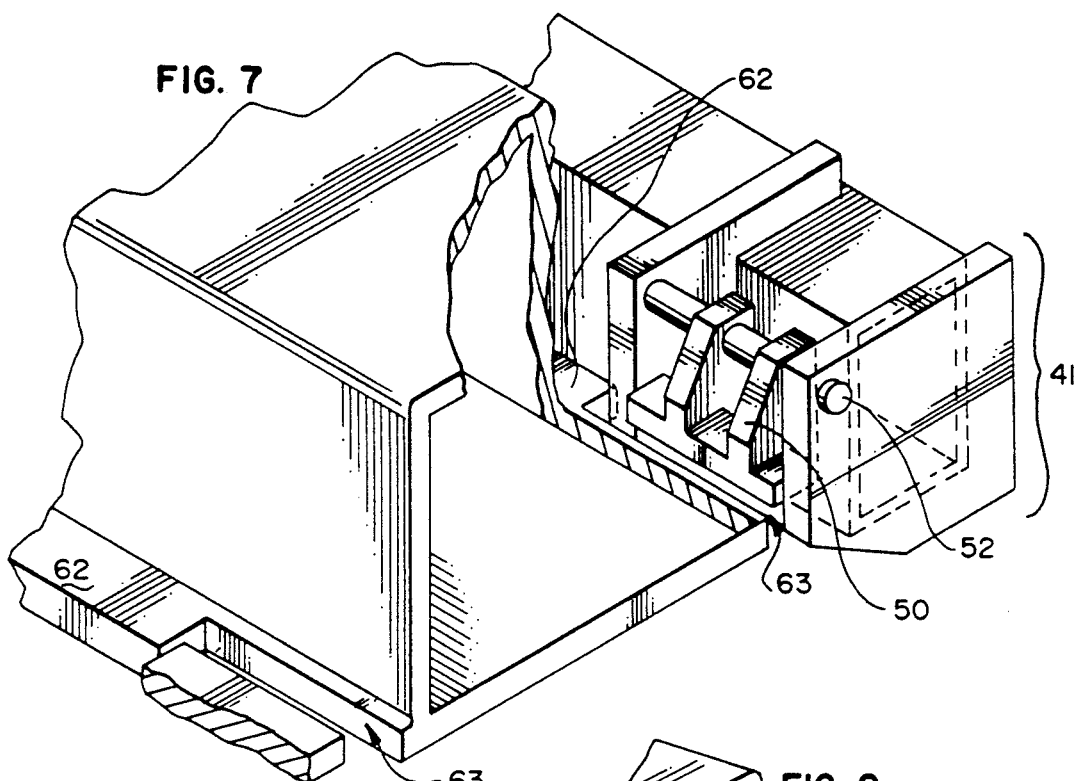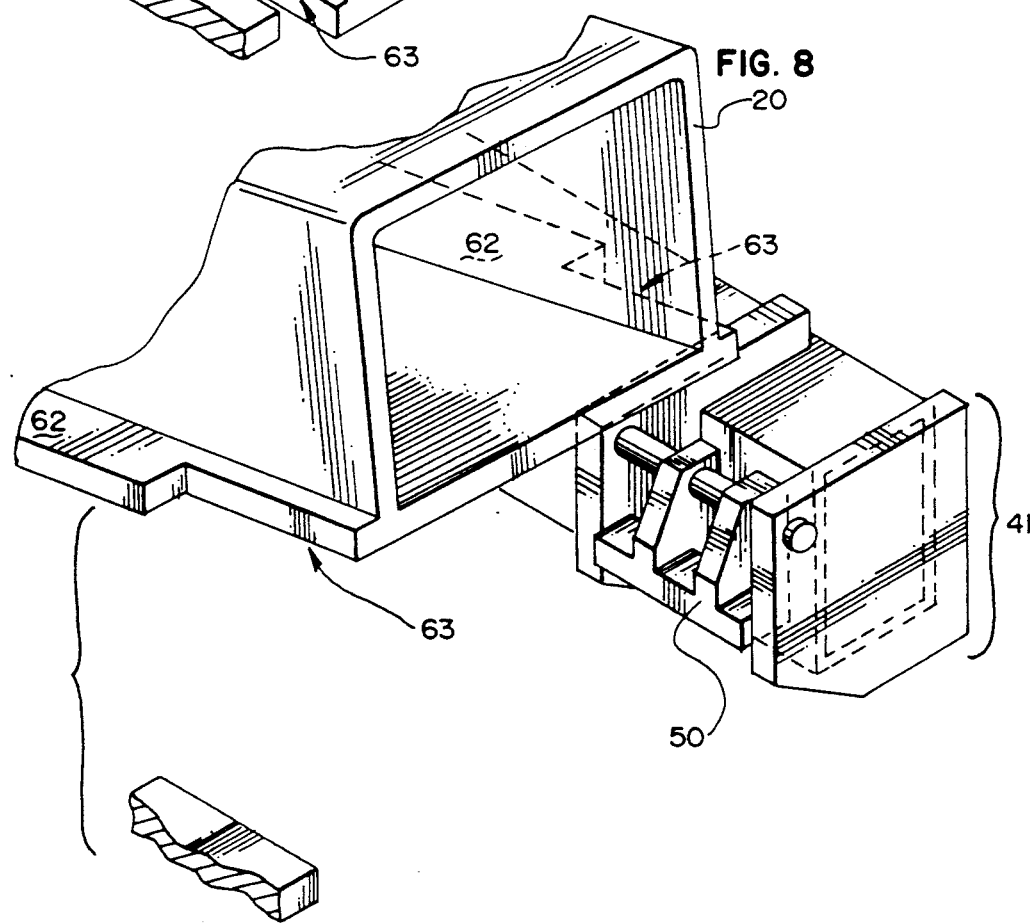

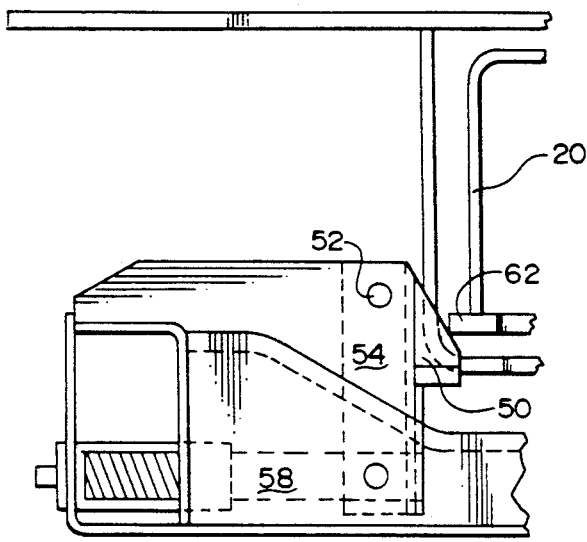
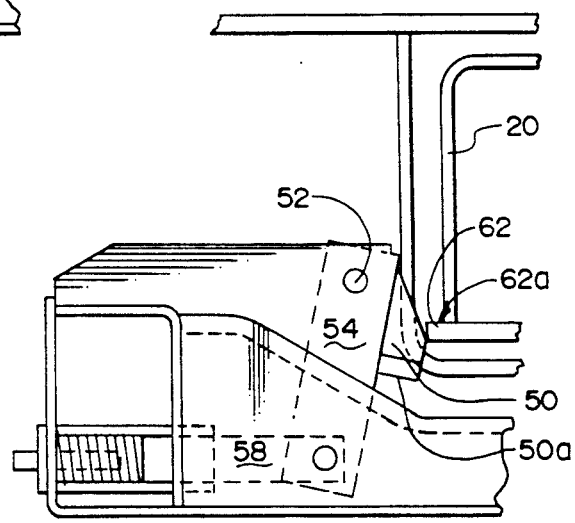
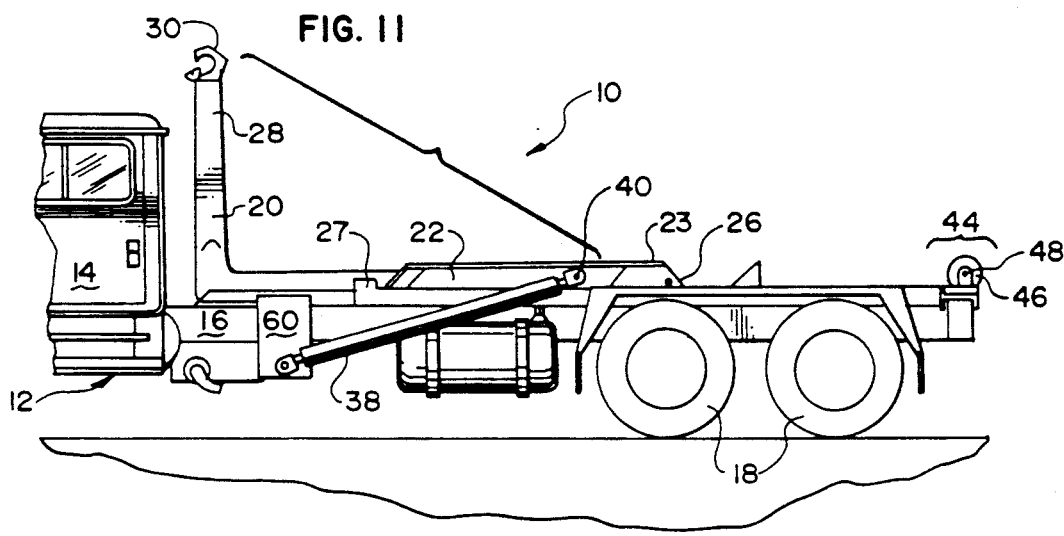

LOADING AND RECOVERY APPARATUS WITH SELF-LOCKING L-ARM

BACKGROUND OF THE INVENTION

The present invention relates generally to a multi-function loading and recovery apparatus and more particularly to an improved loading and recovery apparatus having a locking L-Arm of simple design and construction that is easy and efficient to operate in a wide variety of loading, unloading, dumping and recovery applications.

There are a variety of known pallet or container loading devices which have the ability to serve a dumping function. However, these known devices suffer a number of disadvantages because of their design and construction. Generally, the known devices have complicated arm or boom assemblies necessary to achieve their designated functions. And because of their complicated arm or boom assemblies, the known devices are higher priced, require increased maintenance, require high pressure hydraulic systems to accommodate extreme load weights and are more difficult to operate. Further, while such conventional devices may also utilize a tiltable frame, these devices require a distinct third member, such as metal hooks, to connect the arm or boom assembly to the tiltable frame, in order to lift the tiltable frame. Also, while some conventional devices have the ability to retract or extend their L-Arms, no known devices have the ability to lock a L-Arm to a tiltable frame using a spring-loaded lock connected to the tilt frame and not the L-arm, and thus allow rotation of the arm and frame structure, as one unified piece, while the L-Arm i-s in such a retracted or extended position. Thus, only containers with narrowly constrained lengths can be utilized with such devices. This device obviates the need and associated cost of a subframe.

One known device, f or example, is that disclosed in U.S. Pat. No. 3,892,323. This device functions as a container loading and unloading apparatus and also operates in a dump mode. It consists of an L-Arm which is supported by the sub-frame or vehicle chassis. The L-Arm is activated by a hydraulic ram connected to the vehicle chassis and the L-Arm. The L-Arm is sectioned such that it pivots on an intermediate point along its length and is then pivotally connected to the vehicle chassis behind the rear wheels of the vehicle. The L-Arm is also horizontally extendable through the use of a second hydraulic cam located within a sleeve of the L-Arm.

However, devices of this type have several disadvantages. First, because the L-Arm is sectioned and pivotable about two points, a more complicated mechanical configuration is required which increases maintenance and material costs. Secondly, in certain modes of operation, e.g., dumping, the L-Arm pivots at the end behind the rear wheels of the vehicle. This necessitates the use of larger hydraulic cylinders for effective operation and also increases the tipping moment of the device, which decreases the amount of load which can be lifted before the front wheels of the vehicle lift off of the ground.

Other known devices suffer from these and other disadvantages. Devices of this type are disclosed in U.S. Pat. Nos. 3,819,075, 3,878,948 and 4,175,904. All of these devices have a double pivot L-Arm which necessitates more complicated parts with decreased mechanical advantage.

Another disadvantage in prior art loading devices is the requirement that the load to be recovered or loaded must be of the same configuration as the size of the truck. The pallet to be loaded is of a custom size to fit the particular truck. This requirement is a severe limitation on the use of the loading device when the precise sized pallet or load is not available. Therefore, it is also desirable to have a loading or recovery device that may accommodate a wide range of loads and pallets and still be able to operate in full tilt dumping mode or in a pallet recovery mode which may be referred to as lift and pull.

SUMMARY OF THE INVENTION

In accordance with the present invention, an improved multi-function loading and recovery apparatus is provided and overcomes the problems associated with the known devices, while at the same time, preserving the beneficial features and advantages and achieving additional advantages, such as simple construction, decreased maintenance and lower cost. More specifically, the present invention provides a new and novel L-Arm locking system, outboard mounted cylinders, simplified hydraulic system, increased advantage for more break out force and improved stability which permits improved flexibility of pallet loading and recovery operations.

In the preferred embodiment of the present invention, an improved loading and recovery apparatus for loading and unloading containers, which is operable on the rear of a recovery vehicle having a chassis, cab and front and rear wheels, is provided having an L-Arm pivotally connected at a pivot end to a point generally forward of the rear wheels of the recovery vehicle and extending to a free end disposed on a 900 angle from the chassis. The L-Arm includes an inner boom and an outer boom. A tilt frame is also provided to lock the L-Arm arrangement for operation in a dump mode. Two lifting cylinders are also provided, one end of which is pivotally connected to a generally forward portion of the vehicle chassis and the other end pivotally connected to a generally intermediate portion of the L-Arm. It is preferred to provide two outboard cylinders for broad based and balanced lifting action of the entire loading apparatus. The outboard cylinders permit an increased cylinder angle, thereby gaining mechanical advantage to enable employment of a simpler and less costly low pressure hydraulic system. A hook is provided on the free end of the inner boom of the L-Arm for engagement with a container or pallet. A roller assembly is also provided on the rear of the recovery vehicle for guiding and supporting the container during loading and unloading.

In the disclosed embodiment of the invention, the loading and recovery apparatus includes a dual beam tilt frame mounted on the chassis, an L-Arm that is both extendible and retractable, and means for locking the L-Arm and the tilting frame such that the L-Arm and the tilt frame can be maintained together in a fixed position through a range of L-Arm movement, with the locking means being engageable when the L-Arm is in an extended position. The L-Arm further includes a wide stabilizing frame for added support and balance of the pallet during loading and unloading. Prior art devices are unable to provide such stabilization and, as a result, are subject to catastrophic roll over because of a lack of twin lift cylinders and/or outboard mounting of the cylinders.

In particular, the locking means employed in the preferred embodiment of the present invention includes a locking device affixed onto both sides of the tilt frame. The locking means cooperates with a flange on opposing sides of the inner boom of the L-Arm. When the inner boom is fully retracted, the L-Arm arrangement may rotate independently of the tilt frame. If the inner boom is in a position other than full retraction, it will engage with the locking device present on the tilt frame to affect locking. Locking of the L-Arm to the tilt frame will occur at any position of the inner boom other than full retraction within the outer boom. If the operator rotates the L-Arm to the horizontal load carrying position prior to fully retracting the inner boom, the locking means is spring loaded to accept the inner boom at this position.

It is, therefore, an object of the present invention is to provide an improved multi-function loading and recovery apparatus.

Another object of the present invention is to provide an improved recovery apparatus that is simple in design and construction, yet effective in a wide variety of operating conditions.

A further object of the present invention is to provide a L-Arm which pivots forward of the centerline of the rear wheels of the recovery vehicle.

An additional object of the present invention is to provide an improved recovery apparatus that may be operated from inside the cab of the recovery vehicle.

Still a further object of the present invention is to provide an improved recovery apparatus that has a single pivot, generally horizontally extendable L-Arm with a telescoping inner boom and outer boom.

Yet an additional object of the present invention is to provide an improved recovery apparatus that is simple, effective and inexpensive.

Yet an additional object of the present invention is the provision of a self-locking L-Arm which can be locked to a tilt frame and allow rotation of the L-Arm in unison with the tilt frame.

Yet a further object of the present invention is to provide a locking mechanism which will prevent rotation of the L-Arm when in a locked condition, while allowing rotation of a tilting frame.

Yet another object of the present invention is to provide a locking mechanism which can lock the L-Arm without first fully or partially retracting the L-Arm, and permit the entire unit to dump containers or pallets that are shorter than its own length.

Still another object of the present invention is the provision of a self-locking L-Arm which can be extended and retracted substantial distances, thus allowing containers of various lengths to be conventionally unloaded or tilted and dumped.

BRIEF DESCRIPTION OF THE DRAWINGS

These and other features, objects and advantages of the present invention will become apparent from the following description and drawings wherein like reference numerals represent like elements in the several views, and in which:

FIG. 1 is a side view of the present invention shown with the L-Arm in a fully extended position;

FIG. 2 is a side view of the loading apparatus of FIG. 1 in a dump mode;

FIG. 3 is a side view of the loading apparatus of FIG. 1 illustrating the varying lengths of extension or retraction of the L-Arm;

FIG. 4D is a side view of the apparatus in pallet loading mode illustrating further extension of the cylinder to cause the tilt frame to raise off the truck chassis;

FIG. 5 is a top view of the loading apparatus;

FIG. 6 is a cross-sectional view through line A—A of the locking means of the present invention;

FIG. 7 is a perspective view of the locking means present on the tilt frame with inner boom fully retracted; and FIG. 8 is a perspective view of the locking means with inner boom fully retracted and rotating in pallet loading mode.

FIG. 9 is a cross-sectional view through line A—A of FIG. 5 of one half of the apparatus with locking means when the inner boom is not fully retracted;

FIG. 10 is a cross-sectional view through line A—A of FIG. 5 of one half of the apparatus showing the spring-loaded locking means when the inner boom is not fully retracted;

FIG. 11 is a side view of the present invention illustrating cylinder baskets below the chassis frame rail.

DETAILED DESCRIPTION OF THE PREFERRED EMBODIMENTS

Figure 4A:
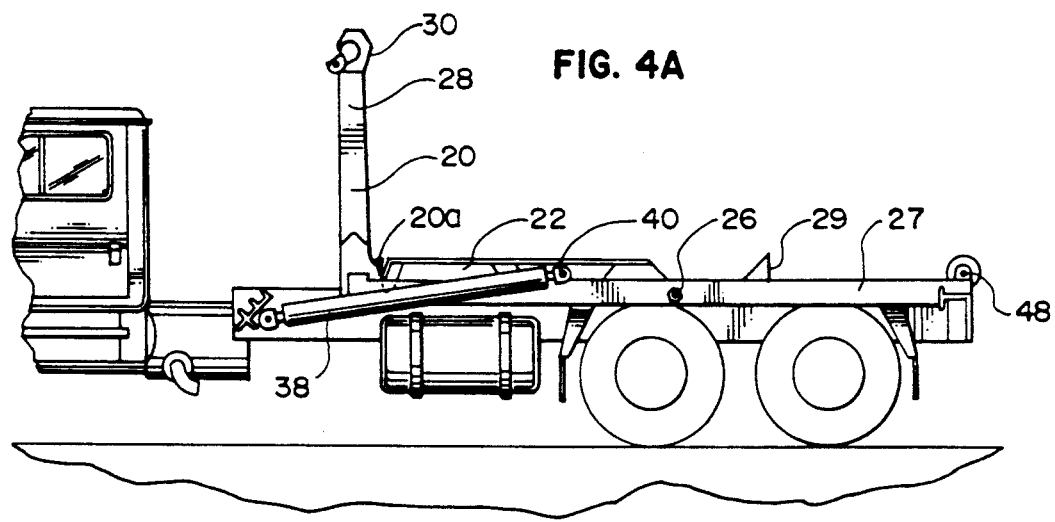
FIG. 4A is a side view of the loading apparatus showing the inner boom in fully retracted and unlocked position illustrating the first position of the invention in a pallet loading mode.

The multi-function loading and recovery apparatus of the present invention is shown generally as 10 in FIG. 1. The invention 10 is conventionally used with a recovery vehicle 12 having a cab 14 and a frame or chassis 16. The recovery vehicle 12 also has front wheels (not shown in FIG. 1) and rear wheels 18. FIG. 1 shows the apparatus of the present invention mounted onto the chassis 16 of vehicle 12. Also shown are outboard mounted cylinders 38 to chassis 16 which are employed to rotate L-Arm 24. As shown in FIG. 11, the outboard cylinders may be mounted to cylinder baskets 60 which may be mounted below the chassis 16. Such positioning of the cylinders permits use of a simplified hydraulic system and provides increased mechanical advantage for additional break out force and improved stability.

Throughout the specification, reference is made to the front or forward, and rear or rearward positions. As used herein, front or forward refers to a direction toward the cab 14 of the recovery vehicle 12 and rear or rearward refers to a direction toward the rear wheels 18 of the recovery vehicle 12.

L-Arm 24 is provided having a pivot end 26 and a free end 28, L-Arm 24 being generally horizontal and parallel to frame 16 when in the load carrying position. L-Arm 24 includes an inner boom 20 and an outer boom 22. Inner boom 20 is L-shaped while outer boom 22 is straight. A dual beam tilt frame 27 provides support to the inner and outer booms. The rearward end of inner boom 20 slidably engages within outer boom 22 to provide a telescoping action. Various conventional means, such as cylinders (not shown), may be employed to actuate the inner boom 20 within the outer boom 22. Attached to free end 28 is a hook 30 or other means to secure and hold a pallet or container (not shown). The open side of hook 30 faces forward toward the cab 14 of the recovery vehicle 12. This arrangement enables the effective loading and unloading functions with varied pallet types, as well as permitting dumping as hereinafter described.

L-Arm 24 is pivotally connected at pivot end 26 to the tilt frame 27 at a location generally forward of the centerline of rear wheels 18. A pair of lifting cylinders 38 are pivotally connected at one end 40 to an intermediate location on the outer boom 22 of L-Arm 24. Another end 42 of lifting cylinders 38 are pivotally connected to a generally forward portion of frame 16.

A roller assembly 44 is provided on the rear of tilt frame 27. Roller assembly 44 consists of a plurality of rollers 46 operably mounted on an axle 48 or other suitable means which is rigidly secured to the tilt frame 27. Roller assembly 44 is designed to support and smoothly guide a pallet in certain stages of loading, unloading and dumping as hereinafter described.

The present invention operates in two different modes. First, the apparatus may operate in a dumping mode and, second, it may operate in a pallet loading mode. Turning now to FIG. 2, the present invention is illustrated in dump mode, simulating a dump truck. In this mode, tilt frame 27 is locked to outer boom 22 and inner boom 20, forming a brace preventing L-Arm 24 from rotating about point 26. Therefore, when cylinder 38 is extended and retracted the entire structure of the tilt frame 27, outer boom 22 and inner boom 20 all move in unison as a single structure. The stabilizing frame 23 is supported on each side by outboard cylinders 38 which provide the stability and support for the frame 27 and pallet or container thereon. Thus, a pallet or load sitting on outer boom 22 and roller arrangement 44 and being secured by hook 30 may be emptied in dump truck fashion while being supported by stabilizing frame 23 and twin outboard cylinders 38. The invention includes an improvement of the locking mechanism, described fully below, which enables tilt frame 27 to easily and simply support and brace the inner boom 20 and outer boom 22 together to ensure dump mode loading or unloading.

Turning now to FIG. 3, a side view of the present invention is shown illustrating how inner boom 20 slidably engages with outer boom 22. The horizontal portion 20a of inner boom 20 fits within outer boom 22 to provide a telescoping action. With the present invention, the inner boom 20 may slide from complete retraction into the outer boom 22 to complete extension. When the inner boom 20 is fully retracted, the apparatus will be prepared for a pallet loading or unloading mode where the unlocked L-Arm structure 24 pivots independently from the tilt frame 27. If the inner boom is in a position of extension other than full retraction, locking action will occur which will be discussed in detail in conjunction with FIGS. 5-10.

Figure 4B:
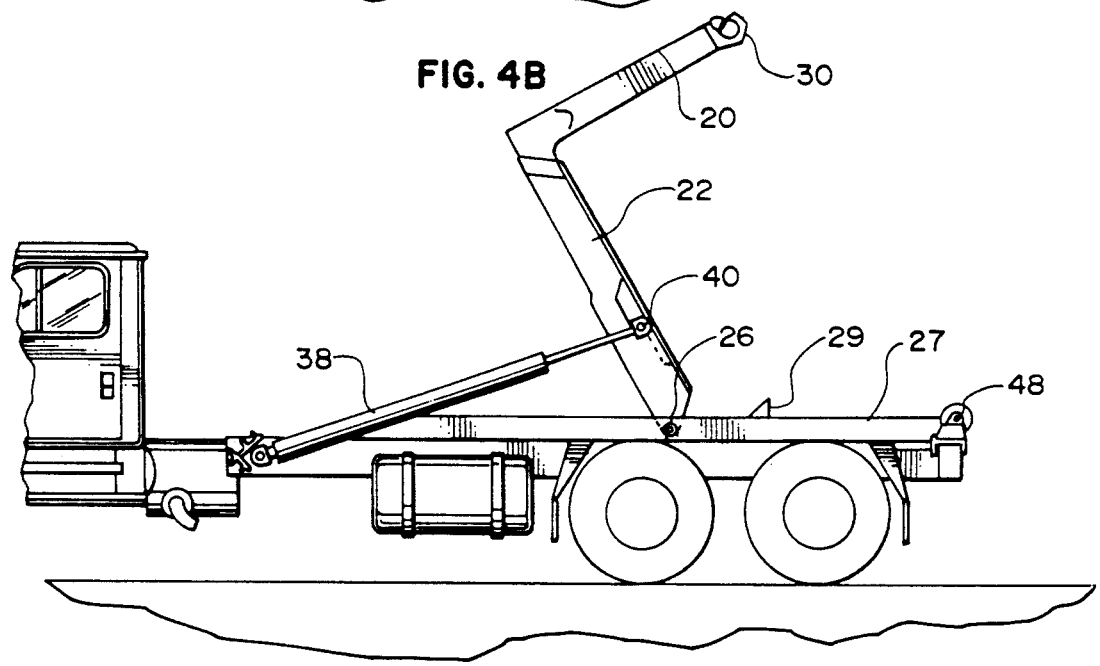
FIG. 4B is a side view of the apparatus in pallet loading mode illustrating the L-Arm being lifted off the bed of the truck.

With reference to FIGS. 4A-D, the pallet mode loading and unloading operation will be discussed in detail. In FIG. 4A, the apparatus of the present invention is shown with inner boom 20 fully retracted with portion 20a almost completely inserted into outer boom 22. With actuation of cylinder 38 at point 40, outer boom 22 will begin to pivot about point 26, as shown in FIG. 4B. It can be seen that inner boom 20, which is engaged in outer boom 22, also pivots in unison with outer boom 22. It is the intention of the pallet loading mode to bring hook 30 in close proximity to a pallet or container that is sitting directly behind the vehicle.

Figure 4C:
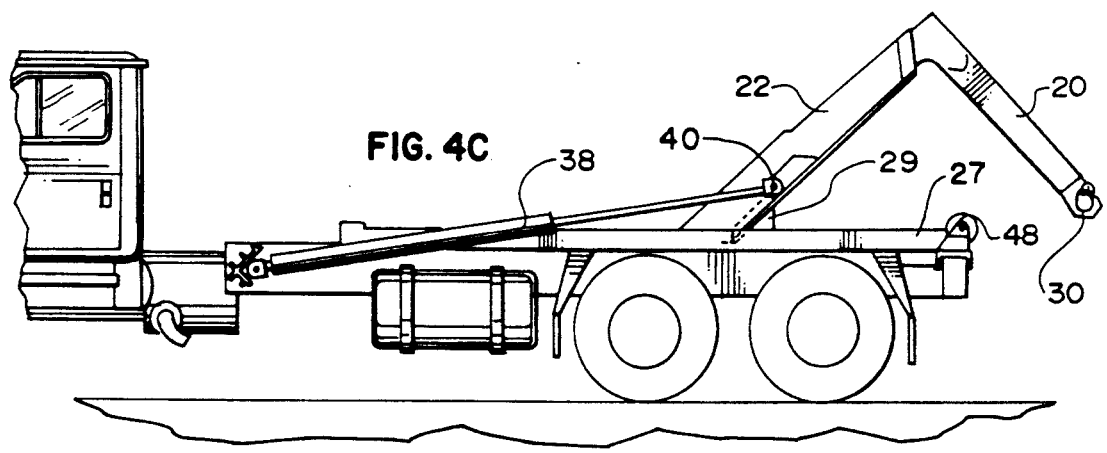
FIG. 4C is a side view of the apparatus in pallet loading mode illustrating rotating of the L-Arm to a stop on the tilt frame.

To recover a pallet or container, hook 30 must be brought into a location behind the rear of the vehicle. Turning now to FIG. 4C, further actuation of cylinder 38, causes outer boom 22, with inner boom 20 engaged therein, to rotate Until it engages stop 29 on tilt frame 27. As shown in FIG. 4D, it is required to further actuate cylinder 38 to position hook 30 as low as possible for recovery of the pallet or container. As can be seen, this further actuation causes tilt frame 27 to lift off the chassis of the vehicle and pivot about pivot point 48. It should be appreciated that once the pallet or container is secured to hook 30, the above-described process is executed in reverse order to effectuate loading of the pallet or container onto the bed of the vehicle.

As discussed above, the loading and recovery apparatus of the present invention has essentially two modes of operation. The apparatus includes a new and novel means for easily and simply switching to and from these different modes of operation. In particular, the present invention includes a locking mechanism for controlling the locking of the L-Arm structure 24 to the tilt frame 27 to operate the apparatus in either the dump mode or the pallet mode.

As shown in FIG. 5, a top view, illustrates the structure of L-Arm arrangement 24 with respect to the tilt frame 27 and chassis 16. More specifically, tilt frame 27 is pivotally secured to the chassis 16 of the truck at the rearmost portion of the chassis near roller arrangement 44. Tilt frame 27 is dual member structure which extends longitudinally along the chassis 16. Secured to tilt frame 27 is L-Arm arrangement 24. Outer boom 22 is pivotally secured to tilt frame 27 at point 26. Inner boom 20 is shown engaged within outer boom 22. A stabilizing frame 23 is also provided on the upper surface of outer boom 22 to provide a broad surface for receiving a pallet or container. The stabilizing frame 23 and twin outboard cylinders 38 assist in supporting a pallet or container when loaded. Further, a locking mechanism 41 is provided on both members of tilt frame 27 at their distal ends.

Now referring to FIGS. 6, 7 and 8, the structure of locking mechanism 41 is shown. It should be understood that the preferred embodiment of the present invention includes two locking mechanisms 41 on both sides of inner boom 20 as in FIG. 6. FIGS. 7 and 8 show operation of only one of the two locking mechanisms 41. In FIG. 6, outer boom 22 is shown with stabilizing frame 23 as its uppermost wall. It is also possible for the outer boom 22 to be an independent member with stabilizing frame 23 being a separate member. Locking mechanisms 41 are present on both the lateral sides of inner boom 20. Each locking mechanism 41 is positioned on tilt frame 27 to be juxtaposed adjacent to only the inner boom 20 and not the outer boom 22.

Each of the locking mechanisms 41 includes a bearing plate 50 which is mounted to a vertical plate 54 which is connected to fixed pivot point 52 at the uppermost portion. The lowermost portion of vertical plate 54 is pivotally secured to shaft 58 at point 56. Shaft 58 is biased by a spring 60. In its resting position, angled bearing plate 50 extends out over flange 62 which extends along the length of inner boom 20. When angled bearing plate 50 is positioned over flange 62 and the operator attempts to pivot L-Arm arrangement 24 by actuating cylinders 38, upper surface 62a of inner boom 20 will engage lower surface 50a of angled bearing plate 50. As a result, inner boom 20 will be locked to tilt frame 27 via locking mechanism 41. Therefore, actuation of cylinders 38, when the apparatus is in this position, will cause L-Arm arrangement 24 and tilt frame 27 to pivot in unison thereby causing operation in dump mode.

Turning now to FIGS. 7 and 8, perspective views of the present invention illustrate how flange 62 can be disengaged from angled bearing plate 50 to prevent locking. As shown in FIG. 7, notch 63 is provided in the flange 62 on the forward end of the horizontal portion 20a of inner boom 20. Notch 63 is disposed generally at the elbow portion of inner boom 20. Therefore, it should be appreciated that full retraction of inner boom 20 places notch 63 directly below locking mechanism 41 and, more specifically, angled bearing plate 50. Notch 63 is preferably of a size that is slightly larger than the length of angled bearing plate 50.

In operation, when inner boom 20 is fully retracted, as also shown in FIG. 4A, notch 63 aligns with angled bearing plate 50. As a result, inner boom 20 passes by locking mechanism 41 thereby rotating independently from tilt frame 27. Since the locking mechanism 41 is not engageable when the inner boom 20 in fully retracted, the pallet loading mode, as discussed in conjunction with FIGS. 4A through 4D, is effectuated. It should be understood that it is preferable that two locking mechanisms be employed for added locking capability.

Due to the new and novel feature of locking on a flange that is present along the entire length of the inner boom 20, locking of the L-Arm arrangement 24 can be realized for accommodation of a wide range of pallets and containers. L-Arm 24 can be locked to tilt frame 27 at any point of telescoping other than complete retraction which represent an unlocked state. This telescoping is executed when the L-Arm arrangement is not pivoted at all and resting on the chassis 16 of the vehicle 12. Referring back to FIG. 3, it can be seen that inner boom 20 may telescope within outer boom 22 to provide a support bed of varying lengths for operation in the dump mode. The present invention allows an adjustment of main member 22 of the L-Arm of a substantial length, up to 2.0 to 6.0 feet. It has been found that this substantial retracting and extending capability of the L-Arm, in conjunction with the utilization of the novel locking mechanism of the present invention, allows the present invention to accommodate containers of between ten and 24 feet in length for straight chassis and up to 40 feet for trailers in the dump mode.

As discussed above, locking can be realized at a wide range of extension or retraction of the L-Arm arrangement 24. Usually this telescoping is executed when the L-Arm is resting on the chassis 16 prior to actuation of cylinders 38. However, in pallet loading mode, it is often required to extend out inner boom 20 to place hook 30 in close proximity to the pallet or container to be recovered. Such extension is often needed because, in pallet loading mode, the inner boom 20 must be fully retracted first so that the notch 63 aligns with angled bearing plate 50. If later extension is needed, operators often forget to retract back inner boom 20 prior to loading the pallet onto the truck. In that case, as shown in FIG. 9, notch 63 is no longer aligned with angled bearing plate 50. Instead, flange 62 will communicate with angled bearing plate 50. Upon further loading and actuation of cylinder 38 bringing inner boom 20 closer to the chassis 16, as shown in FIG. 10, flange 62 bears on angled bearing plate 50 which is spring biased via spring 60. As inner boom 20 moves downward, flange 62 depresses angled bearing plate 50 which pivots about pin 52 and connected to vertical plate 54 which is also connected to shaft 58 via pin 56. Since, the locking mechanism is spring biased, inner boom 20 and accordingly the entire L-Arm arrangement may pass by. When flange 62 passes by lower surface 50a, angled bearing plate 50 snaps back into place so that upper surface 50a can be positioned over upper surface 62a. At that point, L-Arm 24 will be locked to tilt frame 27. If pallet mode operation is now desired, the inner boom 20 must be again fully retracted as discussed above otherwise dump mode will be engaged.

Overall, the present invention provides an improved loading and recovery apparatus which can operate in multiple modes, namely dump mode and pallet loading mode. Automatic locking occurs for operation in dump when the inner boom 20 is not in its fully retracted position. Therefore, dump mode can be realized with a wide range of container sizes obviating the need for a standard sized container. Further, the outer boom 22 includes a stabilizing frame 23 for added support and cylinders 38 are preferably mounted outboard relative to the chassis 16 to provide added balance, stability, mechanical advantage and improved weight distribution. These new and novel features may be realized without the requirement of a multitude of parts which significantly adds to the overall cost and weight of the apparatus. Since all units mount on chassis with maximum permitted weights and are enforced by D.O.T. scales in every state. The highest strongest unit is initial.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

What is claimed is:

1. An improved loading and recovery apparatus for loading and unloading containers, the apparatus being operable from a rearward end of a recovery vehicle having a chassis and front and rear wheels, comprising:
   a tilt frame pivotally mounted on the chassis;
   an extendable and retractable generally L-shaped arm having a first boom and a second boom, and a free end and a pivot end; said L-arm being pivotally connected at said pivot end to said tilt frame; said first boom being generally L-shaped and having first and second members substantially perpendicular to one another;
   a stabilizing frame extending laterally from each side of said L-shaped arm;
   a pair of power actuators for pivoting said L-shaped arm, each power actuator being mounted outboard of the vehicle chassis and connected to opposing lateral sides of said stabilizing frame; and
   a self-locking member for self-locking said L-shaped arm to said tilt frame, whereby said L-shaped arm and said tilt frame can be maintained together in a fixed position through a range of movement.

2. The improved loading and recovery apparatus of claim 1, wherein each power actuator includes at least one outboard mounted lifting cylinder having first and second ends, said first end pivotally connected to a generally forward portion of the vehicle chassis and said second end pivotally connected to an opposing lateral side of said stabilizing frame.

3. The improved loading and recovery apparatus of claim 1, wherein said tilt frame includes two substantially parallel longitudinally extending members pivotally mounted to the vehicle chassis.

4. The improved loading and recovery apparatus of claim 3, wherein said L-arm is nestable between said tilt frame members.

5. The improved loading and recovery apparatus of claim 3, further comprising self-locking means positioned at the distal end of said tilt frame members for maintaining said L-arm in alignment with said tilt frame.

6. The improved loading and recovery apparatus of claim 5, wherein said first member of said first boom has forward and rearward ends and includes at least one flange extending substantially along its entire length.

7. The improved loading and recovery apparatus of claim 6, wherein said flange includes at least one notch located at said forward end of said first member of said first boom.

8. The improved loading and recovery apparatus of claim 6, wherein said self-locking means on said tilt frame engages said flange when said first member of said first boom is not in a fully retracted position;
    whereby said L-arm is prevented from pivoting independently of said tilt arm.

9. The improved loading and recovery apparatus of claim 8, wherein said self-locking means is disengaged from said flange when said first boom is fully retracted due to alignment of said self-locking means with said notch;
    whereby said L-arm is permitted to pivot independently of said tilt frame.

10. The improved loading and recovery apparatus of claim 9, wherein said self-locking means has a spring-biased portion for receiving said flange when said first member of said first boom is not fully retracted within said second member and said L-arm is in a pivoted position, said spring-biased portion of said self-locking means being connected directly to said tilt frame;
    whereby pivoting said L-arm to its nesting position within said tilt frame actuates said spring-biased self-locking means to permit said flange to be engaged by said locking means.

11. The improved loading and recovery apparatus of claim 2, further comprising a pair of structural support members, each of said support members extending laterally from the vehicle chassis and located at a generally forward end of the vehicle chassis, said support members being attached to said first end of said outboard mounted lifting cylinder.

* * * * *

UNITED STATES PATENT AND TRADEMARK OFFICE
CERTIFICATE OF CORRECTION

PATENT NO. : 5,290,138
DATED : March 1, 1994
INVENTOR(S) : Leslie Smart et al.

It is certified that error appears in the above-indentified patent and that said Letters Patent is hereby corrected as shown below:

Column 1, line 35 - "i-s" should be "is"

Column 1, line 40 - "f or" should be "for"

Column 2, line 37 - "900" should be "90°"

Column 6, line 8 - "Until" should be "until"

Signed and Sealed this

Seventh Day of February, 1995

Attest:

BRUCE LEHMAN

Attesting Officer     Commissioner of Patents and Trademarks